US011685093B2

United States Patent
Takehana (10) Patent No.: US 11,685,093 B2
(45) Date of Patent: Jun. 27, 2023

(54) MOLD

(71) Applicant: NISSEI ASB MACHINE CO., LTD., Nagano (JP)

(72) Inventor: Daizaburo Takehana, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 109 days.

(21) Appl. No.: 16/644,669

(22) PCT Filed: Sep. 7, 2018

(86) PCT No.: PCT/JP2018/033157
§ 371 (c)(1),
(2) Date: Mar. 5, 2020

(87) PCT Pub. No.: WO2019/049970
PCT Pub. Date: Mar. 14, 2019

(65) Prior Publication Data
US 2021/0107193 A1 Apr. 15, 2021

(30) Foreign Application Priority Data

Sep. 8, 2017 (JP) .............................. JP2017-173440

(51) Int. Cl.
*B29C 45/73* (2006.01)
*B29C 45/72* (2006.01)
*B29C 33/04* (2006.01)

(52) U.S. Cl.
CPC .......... *B29C 45/7312* (2013.01); *B29C 33/04* (2013.01); *B29C 2045/7214* (2013.01); *B29C 2045/7264* (2013.01)

(58) Field of Classification Search
CPC ..... B29C 45/7312; B29C 45/73; B29C 45/32; B29C 45/72; B29C 33/04; B29C 2045/7214; B29C 2045/7264
See application file for complete search history.

(56) References Cited

U.S. PATENT DOCUMENTS 5,599,567 A * 2/1997 Gellert ................ B29C 45/7312
425/525
5,725,891 A * 3/1998 Reid, Jr. ............. B29C 33/0022
425/408

(Continued)

FOREIGN PATENT DOCUMENTS

CN 1302249 A 7/2001
CN 201040416 3/2008

(Continued)

OTHER PUBLICATIONS

Extended European Search Report issued in European Patent Application No. 18853818.5 dated Apr. 15, 2021.

(Continued)

*Primary Examiner* — Seyed Masoud Malekzadeh
(74) *Attorney, Agent, or Firm* — Greenblum & Bernstein, P.L.C.

(57) ABSTRACT

A mold for injection molding includes: three or more cavity rows, each cavity row having a plurality of cavities; and a cooling flow path configured to allow a cooling medium to flow through the cooling flow path, the cooling medium cooling the cavities, the cooling flow path including: at least one supply port; a distribution conduit communicated with the supply port; a supply conduit communicated with the distribution conduit; a cavity cooling portion communicated with the supply conduit and provided to an outer periphery of the cavities; a discharge conduit communicated with the cavity cooling portion; a collecting conduit communicated with the discharge conduit; and at least one discharge port communicated with the collecting conduit, and the supply conduit and the discharge conduit are parallel to the cavity rows, and at least one supply conduit and at least one discharge conduit are provided for each cavity row.

6 Claims, 7 Drawing Sheets

(56) References Cited

U.S. PATENT DOCUMENTS

| | | | | |
|---|---|---|---|---|
| 5,795,529 | A | * | 8/1998 | Reid, Jr. ............... B29C 33/04 |
| | | | | 264/293 |
| 5,837,299 | A | * | 11/1998 | Bright ............... B29C 45/1769 |
| | | | | 425/526 |
| 5,930,882 | A | * | 8/1999 | Gellert ............... B23P 15/24 |
| | | | | 228/171 |
| 6,017,209 | A | | 1/2000 | Gellert et al. |
| 6,190,157 | B1 | * | 2/2001 | Hofstetter ........... B29C 45/4225 |
| | | | | 425/534 |
| RE38,396 | E | * | 1/2004 | Gellert ............... B23P 15/24 |
| | | | | 228/171 |
| 6,936,206 | B1 | * | 8/2005 | Satoh ............... B29C 45/7306 |
| | | | | 425/127 |
| 7,377,767 | B2 | * | 5/2008 | Dubuis ............... B29C 45/7312 |
| | | | | 425/548 |
| 8,038,434 | B2 | * | 10/2011 | Zuffa ............... B29C 33/04 |
| | | | | 425/525 |
| 8,512,028 | B2 | * | 8/2013 | Fields ............... B29C 49/062 |
| | | | | 425/526 |
| 8,512,625 | B2 | * | 8/2013 | Fields ............... B29C 49/063 |
| | | | | 425/526 |
| 8,562,334 | B2 | * | 10/2013 | Fields ............... B29C 49/063 |
| | | | | 425/526 |
| 8,877,117 | B2 | * | 11/2014 | Fields ............... B29C 48/397 |
| | | | | 264/537 |
| 9,132,581 | B2 | * | 9/2015 | Fields ............... B29C 49/063 |
| 2006/0204605 | A1 | * | 9/2006 | Neter ............... B29C 49/6427 |
| | | | | 425/526 |
| 2006/0263466 | A1 | | 11/2006 | Lausenhammer et al. |
| 2006/0283210 | A1 | * | 12/2006 | Dubuis ............... B29C 45/7312 |
| | | | | 65/357 |
| 2008/0277820 | A1 | * | 11/2008 | Zuffa ............... B29C 33/04 |
| | | | | 264/219 |
| 2009/0068307 | A1 | | 3/2009 | McCready |
| 2012/0128812 | A1 | | 5/2012 | Fields et al. |
| 2012/0189727 | A1 | | 7/2012 | Horigome et al. |
| 2013/0149408 | A1 | | 6/2013 | Horigome et al. |
| 2013/0196020 | A1 | | 8/2013 | Nakahara |
| 2014/0131920 | A1 | | 5/2014 | Nakahara |
| 2016/0193769 | A1 | | 6/2016 | Rodinsky |
| 2016/0271850 | A1 | * | 9/2016 | Schad ............... B29C 45/7207 |
| 2016/0361860 | A1 | | 12/2016 | Nakahara |

FOREIGN PATENT DOCUMENTS

| | | |
|---|---|---|
| CN | 201597134 U | 10/2010 |
| CN | 102441971 | 5/2012 |
| CN | 102548730 A | 7/2012 |
| CN | 103223709 A | 7/2013 |
| CN | 103921408 A | 7/2014 |
| CN | 105437470 A | 3/2016 |
| CN | 105599247 A | 5/2016 |
| CN | 205219660 U | 5/2016 |
| CN | 107097365 A | 8/2017 |
| EP | 0 688 656 | 12/1995 |
| EP | 1 950 020 | 7/2008 |
| EP | 3 033 206 | 6/2016 |
| JP | 8-39622 | 2/1996 |
| JP | 9-117916 | 5/1997 |
| JP | 2000-202884 | 7/2000 |
| JP | 2000-511837 | 9/2000 |
| JP | 2005-041230 A | 2/2005 |
| JP | 2010-253792 | 11/2010 |
| JP | 2011-194865 | 10/2011 |
| JP | 2017-94668 | 6/2017 |
| WO | 2007/034815 | 3/2007 |
| WO | 2015/021536 A1 | 2/2015 |
| WO | 2017/109898 | 6/2017 |

OTHER PUBLICATIONS

Office Action issued in corresponding Chinese Patent Application Nu. 201880068306.7 dated May 27, 2021, along with English translation thereof.

Office Action issued in corresponding Korean Patent Application No. 10-2020-7009478 dated Mar. 19, 2021, and English Translation thereof.

Official Communication (ISA/237) issued in International Application No. PCT/JP2018/033157, dated Nov. 6, 2018 and English translation thereof.

Official Communication (ISA/210) issued in International Application No. PCT/JP2018/033157, dated Nov. 6, 2018, and English translation thereof.

Office Action issued in Corresponding JP Application No. 2019-541016, dated Apr. 19, 2022, along with an English translation thereof.

Office Action issued in Corresponding Cn Patent Application No. 202210275840.3, dated Apr. 22, 2023, along with an English translation thereof.

* cited by examiner

MOLD

TECHNICAL FIELD

The present invention relates to a mold for injection molding.

BACKGROUND ART

PTL 1 discloses a cooling system for an eight-row type molding plate, in which one water supply port and one water discharge port are provided. Specifically, PTL 1 discloses that the cooling system an operation, in which a single circuit is temporarily divided into two rows to concurrently cool two rows of injection cavities and then the two rows become again a single circuit, is sequentially repeated four times. Also, PTL 2 discloses a rotary conveyance type blow-molding machine including a pitch changing mechanism configured to change a distance between rows of two-row type neck mold. PTL 2 also discloses a two-row type mold used for the blow-molding machine.

CITATION LIST

Patent Literature

PTL 1: US 2006/0263466 A
PTL 2: JP-A-2011-194865

SUMMARY OF INVENTION

Technical Problem

In the cooling system as disclosed in PTL 1, the number of supply and discharge ports are small and thus a workability is good. However, since the single circuit cools eight rows of the molding plate, a water temperature difference between a first row and an eight row is significantly increased, thereby causing a difference in cooling conditions.

Also, in the rotary conveyance type blow-molding machine including the pitch changing mechanism as disclosed in PTL 2, it is possible to save a space and to enhance productivity by employing a mold having three or more rows. However, since the blow-molding machine includes the pitch changing mechanism, an area in which a water supply port and a water discharge port is provided are limited. In the above conventional techniques, it is difficult to evenly cool an inner row and outer rows of a mold, which has three or more rows, under a similar cooling condition.

Accordingly, an object of the present invention is to provide a mold for injection molding in which an enhanced cooling efficiency can be secured and also cooling conditions can be made even.

Solution to Problem

In order to solve the above object, the present invention provides a mold for injection molding, the mold including:
three or more cavity rows, each cavity row having a plurality of cavities; and
a cooling flow path configured to allow a cooling medium to flow through the cooling flow path, the cooling flow path including:
at least one or more supply port;
a distribution conduit communicated with the supply port;
a supply conduit communicated with the distribution conduit;
a cavity cooling portion communicated with the supply conduit and provided to an outer periphery of the cavities;
a discharge conduit communicated with the cavity cooling portion;
a collecting conduit communicated with the discharge conduit; and
at least one or more discharge port communicated with the collecting conduit,
in which the supply conduit and the discharge conduit are parallel to the cavity rows, and at least one supply conduit and at least one discharge conduit are provided for each cavity row.

According to this configuration, it is possible to provide a mold for injection molding in which an enhanced cooling efficiency can be secured and also cooling conditions can be made even.

In the mold of the present invention, preferably,
two supply conduits and two discharge conduits are provided for each cavity row, and
the cooling medium is configured to be supplied from one supply conduit to the cavity cooling portion corresponding to a half part of each cavity row.

According to this configuration, it is possible to provide a mold in which cooling conditions are made further even.

In the mold of the present invention, preferably,
the distribution conduit and the collecting conduit are respectively provided for each supply port and for each discharge port, and
each distribution conduit is provided independently, and each collecting conduit is provided independently.

According to this configuration, it is possible to stably supply and discharge the cooling medium, thereby stably performing cooling.

In the mold of the present invention, preferably,
the mold is for a molding machine including a pitch changing mechanism configured to change a distance between rows of neck molds, and
the supply port and the discharge port are provided in a non-interference area with respect to the pitch changing mechanism.

According to this configuration, if the mold is used for a molding machine including the pitch changing mechanism, it is possible to suitably cool the mold.

In the mold of the present invention, preferably,
the cavity is defined by an inner member, the inner member being fitted in a recess portion of the mold, the inner member being configured by two members of an inner cavity member and a cavity ring. Also, more preferably, the inner cavity member has an inner wall surface defining the cavity and includes a shoulder portion abutting against a neck mold during injection molding, the cavity ring is a member having a hollow space inside the cavity ring, the inner cavity member being arranged in the hollow space, the cavity ring including an upper surface portion abutting against the shoulder portion, and a flow path provided in the inner cavity and the cavity ring configures the cavity cooling portion.

Advantageous Effects of Invention

According to the present invention, it is possible to provide a mold for injection molding in which an enhanced cooling efficiency can be secured and also cooling conditions can be made even.

BRIEF DESCRIPTION OF DRAWINGS

FIG. 3(a), FIG. 3(b), and FIG. 3(c) are each sectional views of the mold according to the embodiment, in which

MODE FOR CARRYING OUT THE INVENTION

Figure 1:
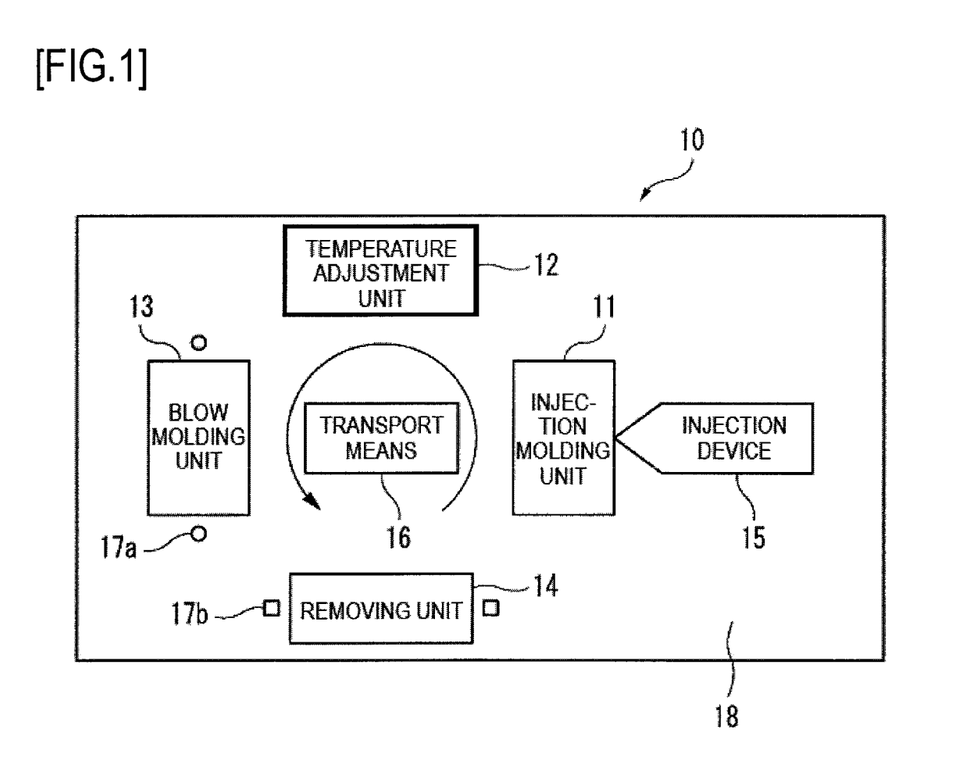
FIG. 1 is a block diagram of a molding machine according to an embodiment.

Hereinafter, exemplary embodiments of the present invention will be described with reference to the accompanying drawings. Meanwhile, it should be noted that dimensions of members shown in the figures may be differ from actual dimensions of the members for convenience of explanation. First, a molding machine 10 for manufacturing a molded article will be described with reference to FIG. 1. FIG. 1 is a block diagram of the molding machine 10.

As shown in FIG. 1, the molding machine 10 includes, on a base 18 of the molding machine 10, an injection molding unit 11 for manufacturing a preform and a temperature adjustment unit 12 for adjusting a temperature of the manufactured preform. The injection molding unit 11 is connected with an injection device 15 for feeding a resin material that is a raw material. Also, the molding machine 10 includes a blow-molding unit (an example of a blowing device) 13 for blow-molding the preform to manufacture a molded article, and a removing unit 14 for removing the manufactured molded article.

The injection molding unit 11, the temperature adjustment unit 12, the blow molding unit 13 and the removing unit 14 are provided at locations rotated from one another by a predetermined angle (90° in the present embodiment) around a transport means 16. The transport means 16 includes a rotary plate 16a and the like. A neck mold 41 is attached to the rotary plate 16a. The neck mold 41 is configured to be opened and closed via a neck mold guide member 42 and a pitch changing mechanism 40. A molded article (preform or container), of which a neck portion is supported by the neck mold 41, can be transported to each unit in accordance with intermittent rotation (each rotation of 90°) of the rotary plate 16a. A plurality of the neck molds 41 are held by the rotary plate 16a. For example, three rows of the neck molds 41, in which one row includes twelve neck molds, are held parallel to each other in a radial direction of the rotary plate 16a. Also, the neck mold guide member 42 is provided with the pitch changing mechanism 40. The pitch changing mechanism 40 is a linkage mechanism suspended from both ends of two neck mold guide members 42 (see FIG. 4). The pitch changing mechanism 40 is configured to change a distance between rows of the neck molds 41 depending on molding processes. Further, a wide pitch changing drive unit 17a for widening a pitch is provided to the blow molding unit 13, and a narrow pitch changing drive unit 17b for narrowing the pitch is provided to the removing unit 14.

Figure 4:
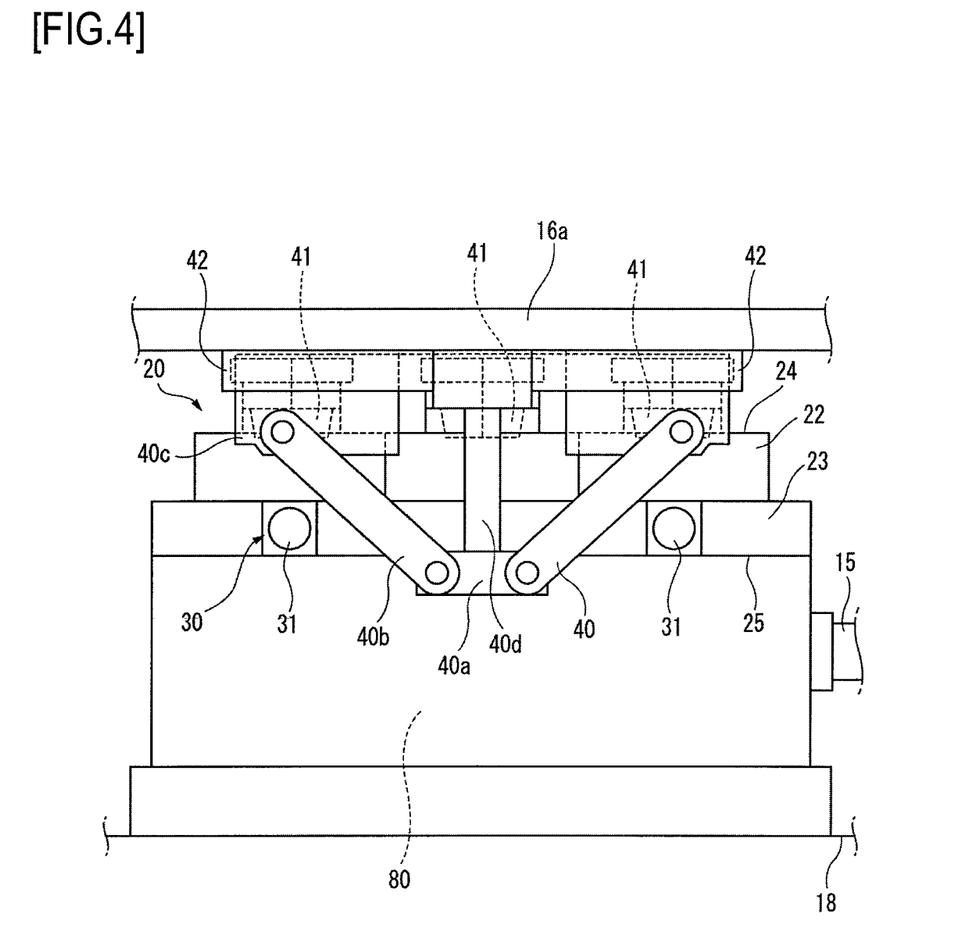
FIG. 4 is a view showing an aspect in which a neck mold having a pitch changing mechanism is clamped on the mold according to the embodiment.

Herein, the detailed configuration or operation of the pitch changing mechanism 40 will be described with reference to FIG. 4. Meanwhile, broken lines in FIG. 4 are imaginary lines representing an interior shape of the members shown in the figure. The pitch changing mechanism 40 includes at least a pressed portion 40a, a link portion 40b, a neck mold holding portion 40c, and a pitch maintaining portion 40d. The neck mold holding portion 40c is configured to hold an outer row of neck molds 41 and to be slidably supported by the neck mold guide member 42. The center row of neck molds 41 is directly supported by the neck mold guide member 42. When a lower surface of the pressed portion 40a is pressed by a pressing rod of the wide pitch changing drive unit 17a at the same time as mold-opening in the blow molding unit 13, the neck mold holding portion 40c is slid on the neck mold guide member 42 via the link portion 40b. Thus, the outer row of neck molds 41 is moved in a direction away from the center row of neck molds 41, so that a distance (pitch) between the rows is widened (the pitch becomes wide). Then, the distance between the rows is maintained by the pitch maintaining portion 40d. Subsequently, once the neck molds 41 in such a state are moved to the removing unit 14 and then molded articles are demolded from the removing unit 14, the outer row of neck molds 41 are slid toward the center row of neck molds 41, so that the distance between the rows is narrowed (the pitch becomes narrow). Then, the distance is maintained by the pitch maintaining portion 40d. In this way, the center row of neck molds 41 is remained stationary and the outer row of neck molds 41 is slid, and thus, the distance between the rows can be changed. Meanwhile, the narrow pitch is a distance between the rows of neck molds 41 in the injection molding unit 11 or the temperature adjustment unit 12.

The injection molding unit 11 includes an injection cavity mold, an injection core mold (not shown), neck molds and the like. A resin material can be injected from the injection device 15 into a preform-shaped space defined by clamping these molds, thereby manufacturing a bottomed preform.

The temperature adjustment unit 12 is configured to heat the preform manufactured in the injection molding unit 11 and thus to adjust a temperature of the preform to a temperature suitable for stretching and blowing the preform. Also, a configuration of the temperature adjustment unit 12 may employ any types of a heating pot type, a temperature adjustment pot type, an infrared heater type, an RED type and an electromagnetic wave heating type.

The blow molding unit 13 is configured to perform a final blow on the preform, of which a temperature has been adjusted by the temperature adjustment unit 12, using a mold formed as a split mold, thereby manufacturing a resin container.

The removing unit 14 is configured to release a neck portion of the molded article, which has been manufactured by the blow molding unit 13, from the neck mold, thereby removing the molded article.

Figure 2:
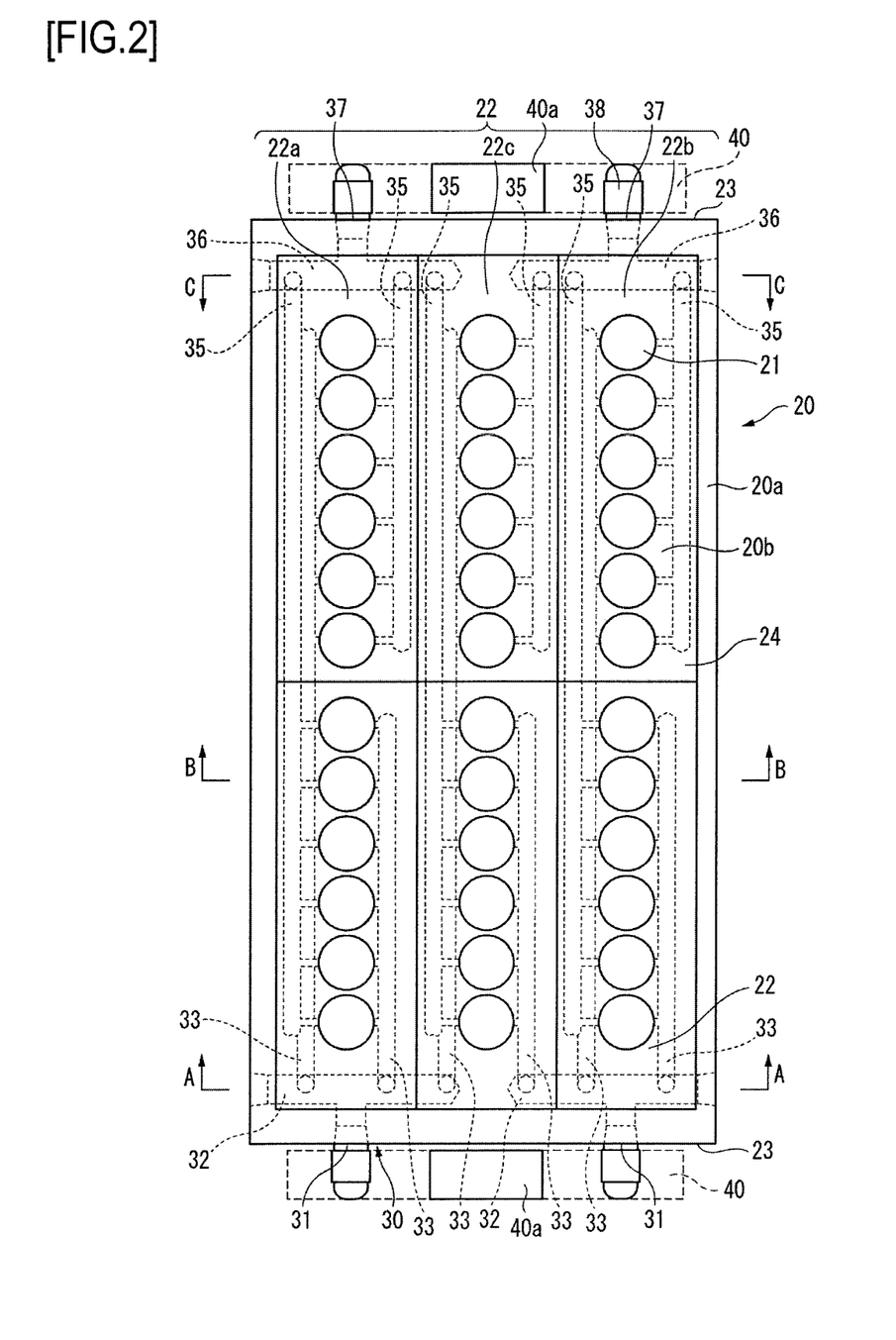
FIG. 2 is a schematic plan view of a mold according to an embodiment.
Figure 3A:
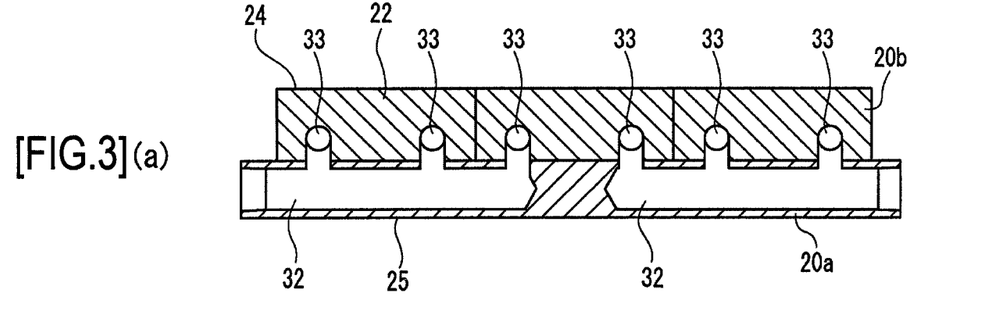
FIG. 3(a) is a sectional view taken along a line A-A in FIG. 2.
Figure 3B:
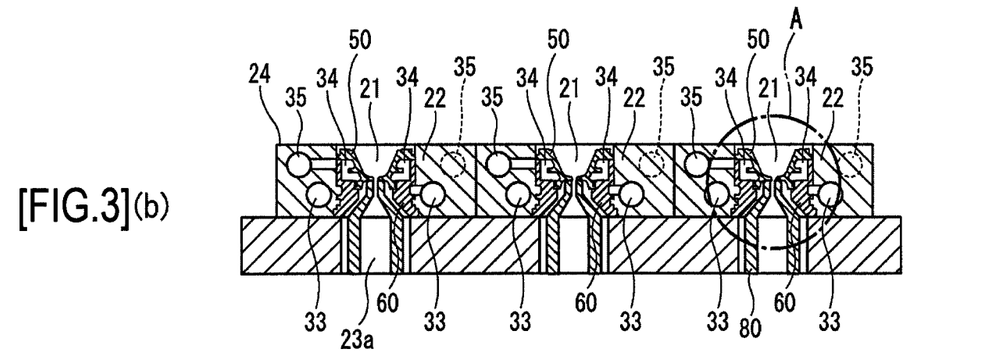
FIG. 3(b) is a sectional view taken along a line B-B in FIG. 2.
Figure 3C:
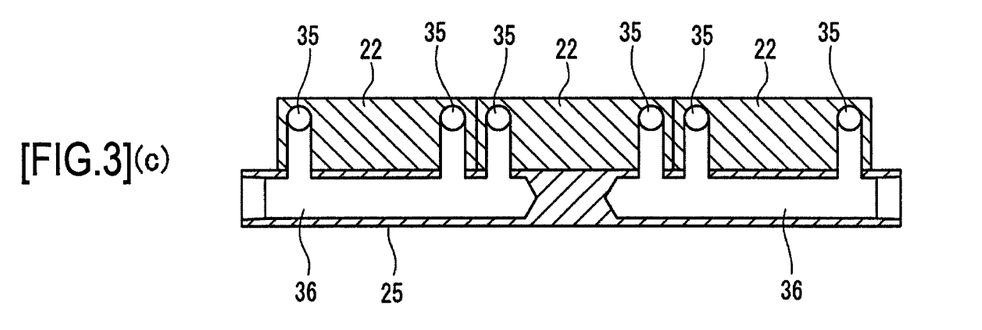
FIG. 3(c) is a sectional view taken along a line C-C in FIG. 2.

Next, an injection cavity mold 20 equipped in the injection molding unit 11 will be described with reference to FIGS. 2 and 3. FIG. 2 is a schematic plane view of the cavity mold 20, and FIG. 3 is sectional views of the cavity mold 20, in which part (a) is a sectional view taken along a line A-A in FIG. 2, part (b) is a sectional view taken along a line B-B in FIG. 2 and part (c) is a sectional view taken along a line C-C in FIG. 2. Meanwhile, broken lines in FIGS. 2 and 3 are imaginary lines representing the interior shape of the members shown in the figures.

The injection cavity mold 20 includes an injection cavity block fixing plate 20a on a lower side of the injection cavity mold 20 and an injection cavity block 20b on an upper side of the injection cavity mold 20. The injection cavity block 20b includes at least three cavity rows 22, each cavity row 22 having a plurality of cavities 21 (e.g., twelve cavities). FIG. 2 shows a positional relationship between outer cavity rows 22a, 22b and an inner cavity row 22c. Also, the injection cavity mold 20 includes therein a cooling flow path configured to allow a cooling medium cooling the cavities 21 to flow through the cooling flow path. For example, a cooling water may be employed as the cooling medium.

Figure 5:
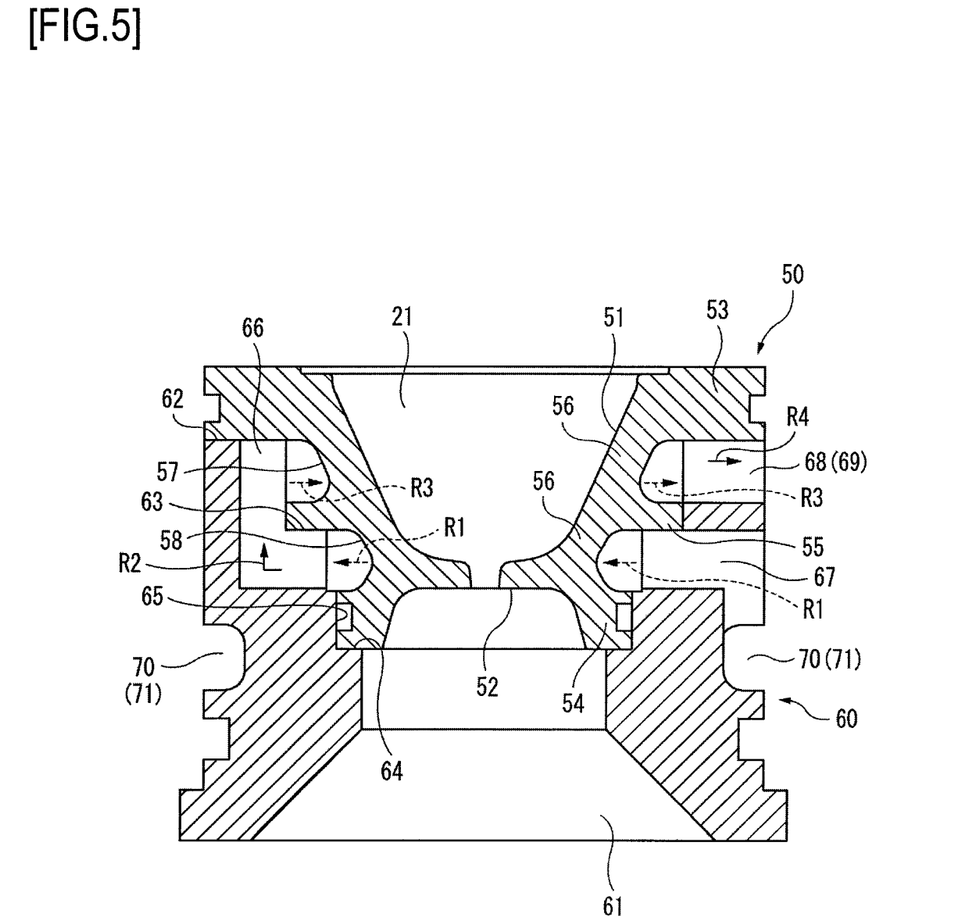
FIG. 5 is a view showing details of an inner member in a section surrounded by a circle A in FIG. 3.
Figure 6:
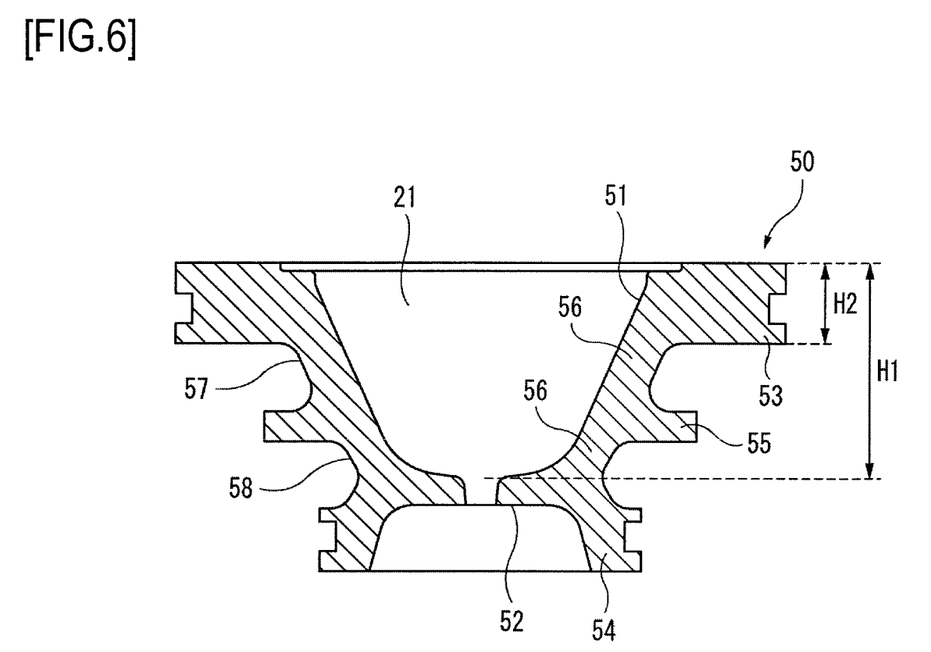
FIG. 6 is a sectional view showing an inner cavity.
Figure 7:
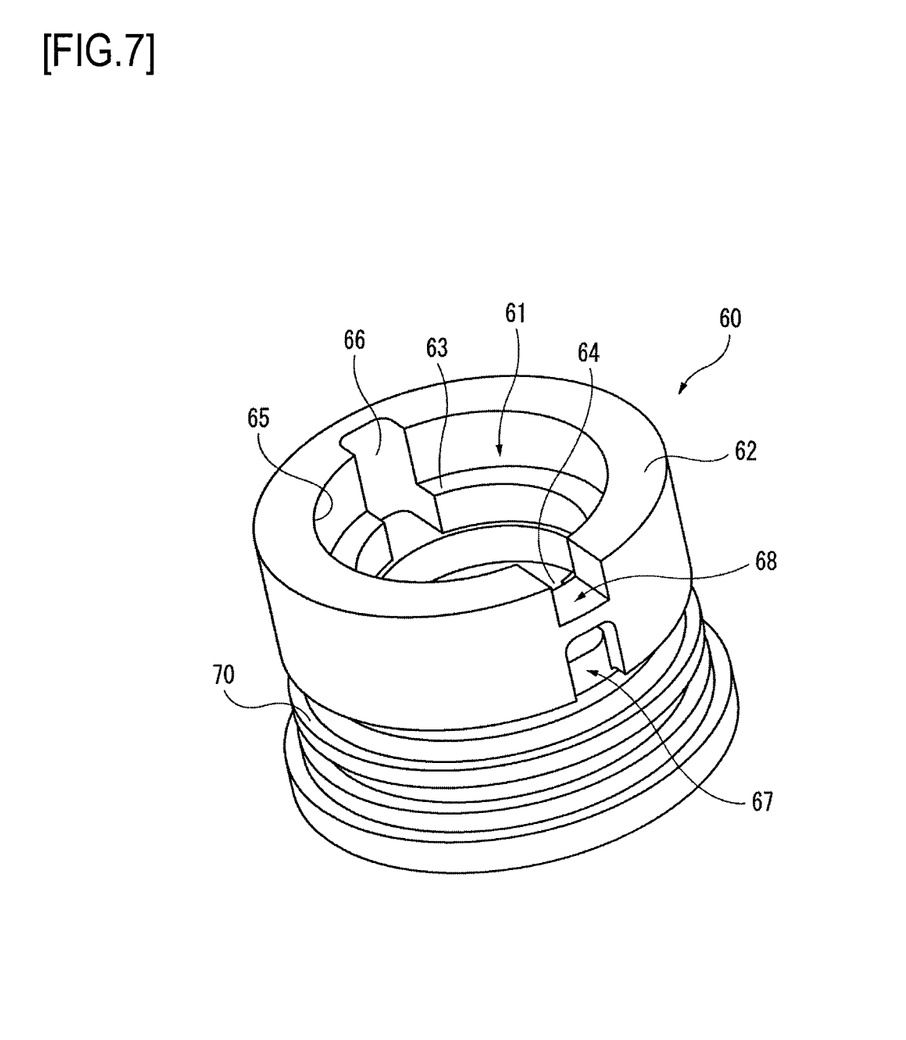
FIG. 7 is a perspective view showing a cavity ring.

Each of the cavities 21 is defined by an inner member. The inner member is fitted in a recess portion (cavity cooling portion 34) of the injection cavity mold 20. The inner member is configured by an inner cavity member 50 and a cavity ring 60. Here, the inner cavity member 50 and the cavity ring 60 will be described in detail with reference to FIGS. 5 to 7. FIG. 5 is a view showing details of the inner member in a section surrounded by a circle A in FIG. 3. As shown in FIG. 5, the inner cavity member 50 is placed above the cavity ring 60. FIG. 6 is a sectional view showing the inner cavity member 50. FIG. 7 is a perspective view showing the cavity ring 60.

As shown in FIGS. 5 and 6, the inner cavity member 50 has an inner wall surface 51 defining the cavity 21, and includes a gate portion 52 communicated with the inner wall surface 51 and configured to introduce a resin material from a hot runner into the cavity 21. The inner cavity member 50 includes a shoulder portion 53 provided around an outer periphery of the cavity 21, protruding from the cavity 21 toward the outside, and abutting, during injection molding, against a lower surface of the neck mold 41. The inner cavity member 50 includes a leg portion 54 provided around an outer periphery of the gate portion 52 and protruding from the gate portion 52 toward the outside. The inner cavity member 50 includes a body protrusion portion 55 provided around the outer periphery of the cavity 21, protruding from the cavity 21 toward the outside, and positioned between the shoulder portion 53 and the leg portion 54. The shoulder portion 53, the leg portion 54, and the body protrusion portion 55 are connected via a body portion 56. The inner cavity member 50 has a first flow path defining portion 57 which is a recess portion defined by the shoulder portion 53, the body portion 56 and the body protrusion portion 55. The inner cavity member 50 has a second flow path defining portion 58 which is a recess portion defined by the body protrusion portion 55, the body portion 56 and the leg portion 54. The shoulder portion 53 has a thickness H2 equal to or greater than a quarter of a depth H1 of the cavity 21. The shoulder portion 53 is thicker than the body protrusion portion 55 and the leg portion 54. The body portion 56 separates the cavity 21 from the cooling medium. The body portion 56 defines the first flow path defining portion 57 and the second flow path defining portion 58.

As shown in FIGS. 5 and 7, the cavity ring 60 is a member having therein a hollow space 61 in which the inner cavity member 50 and the hot runner are to be arranged. The cavity ring 60 includes an upper surface portion 62 abutting against the shoulder portion 53 of the inner cavity member 50. The cavity ring 60 includes an upper step portion 63 on which the body protrusion portion 55 of the inner cavity member 50 is to be placed. The cavity ring 60 includes a lower step portion 64 on which the leg portion 54 of the inner cavity member 50 is to be placed. A third flow path defining portion 66, which is a recess portion formed by cutting out parts of the upper step portion 63 and the upper surface portion 62, is provided at a part of an inner wall 65 of the cavity ring 60. A first through-hole 67 extending through the upper step portion 63 and a cutout 68 obtained by cutting out the upper surface portion 62 are provided at the inner wall 65 opposite the third flow path defining portion 66. A second through-hole 69 is provided by placing the lower surface of the shoulder portion 53 onto the upper surface of the cutout 68. An annular groove 70 is provided on an outer peripheral surface of the cavity ring 60 such that the annular groove 70 is connected with a lower end portion of the first through-hole 67. A fourth flow path defining portion 71 is provided by bringing the annular groove 70 into contact with an inner peripheral surface of the recess portion of the injection cavity mold 20.

In a state where the inner member configured by the inner cavity member 50 and the cavity ring 60 is fitted in the recess portion of the injection cavity mold 20, the leg portion 54 abuts against the lower step portion 64 at bottom and side surfaces of the leg portion 54, the body protrusion portion 55 abuts against the upper step portion 63 at bottom and side surfaces of the body protrusion portion 55, and the shoulder portion 53 abuts against the upper surface portion 62 at a bottom surface of the shoulder portion 53. A liquid-tight seal member is provided in a recess portion formed in a side surface of the lower step portion 64 and a side surface of the leg portion 54. In this state, the first through-hole 67 is communicated with the second flow path defining portion 58, the second flow path defining portion 58 is communicated with the third flow path defining portion 66, the third flow path defining portion 66 is communicated with the first flow path defining portion 57, and the first flow path defining portion 57 is communicated with the second through-hole 69. Also, the fourth flow path defining portion 71 is communicated with the first through-hole 67.

The cooling flow path 30 includes: a supply port 31; a distribution conduit 32 communicated with the supply port 31; a supply conduit 33 communicated with the distribution conduit 32; a cavity cooling portion 34 communicated with the supply conduit 33; a discharge conduit 35 communicated with the cavity cooling portion 34; a collecting conduit 36 communicated with the discharge conduit 35; and a discharge port 37 communicated with the collecting conduit 36. A cooling pipe 38 for supplying the cooling medium and a cooling pipe 38 for discharging the cooling medium are connected to the supply port 31 and the discharge port 37, respectively. Meanwhile, the supply port 31, the distribution conduit 32, the collecting conduit 36 and the discharge port 37 are provided in the injection cavity block fixing plate 20a, whereas the supply conduit 33, the cavity cooling portion 34 and the discharge conduit 35 are provided in the injection cavity block 20b. That is, the distribution conduit 32 and the collecting conduit 36, which have larger diameters, are arranged below the supply conduit 33 and discharge conduit 35, which have smaller diameters, so that the distribution conduit 32 and the collecting conduit 36 are provided at different heights from the supply conduit 33 and discharge conduit 35. Therefore, it is possible to downsize the injection cavity block 20b such that the injection cavity block 20b is prevented from interfering with the pitch changing mechanism 40 (e.g., the neck mold guide member 42). Also, it is possible to increase the number of cavities 21 per unit area.

Two supply ports 31 are provided on a side surface 23 of the cavity mold 20, the side surface 23 being perpendicular to the cavity rows 22. The two supply ports 31 are provided at locations, on the side surface 23, which are spaced from the center of the side surface 23. The distribution conduit 32 is provided at a location, on the injection cavity mold 20, which is located closer to the side surface 23 than to the cavity 21. The distribution conduit 32 is configured to distribute the cooling medium supplied from the supply port 31 into three flow paths. Two distribution conduits 32 are provided, and the respective distribution conduits 32 are communicated with the respective supply ports 31, independently. Also, each of the distribution conduits 32 extends from the outer cavity row 22a (22b) to the inner cavity row 22c.

Three supply conduits 33 are provided for one distribution conduit 32, and thus communicated with the same one distribution conduit 32. Also, the supply conduits 33 are provided to be parallel to each other within a range of extension of the corresponding distribution conduit 32. One supply conduit 33 is communicated with lower portions of the cavity cooling portions 34 corresponding to a half part of a cavity row 22 (six cavities). A supply conduit 33 communicated with the cavity cooling portion 34 provided around the half number of cavities 21, which is located close to the supply port 31, extends up to the half part of the corresponding cavity row 22. A supply conduit 33 communicated with the cavity cooling portion 34 provided around of the half number of cavities 21, which is located apart from the supply port 31, extends up to a cavity 21 located on the farthest side from the supply port 31.

Each of the cavity cooling portions 34 are provided around the outer periphery of the respective cavities 21. The cooling medium to the cavity cooling portion 34 through the supply conduit 33 communicated with the lower portion of the cavity cooling portion 34. Also, the discharge conduit 35 is communicated with an upper portion of the cavity cooling portion 34. The cooling medium is discharged from the cavity cooling portion 34 through the discharge conduit 35.

Also, the cavity cooling portion 34 is configured by the first flow path defining portion 57 of the inner cavity member 50, the second flow path defining portion 58 of the inner cavity member 50, the third flow path defining portion 66 of the cavity ring 60, the first through-hole 67 of the cavity ring 60, and cutout 68 of the cavity ring 60 (see FIG. 5). Herein, a behavior of the cooling medium in the cavity cooling portion 34 will be described. First, the cooling medium is introduced from the supply conduit 33 into a flow path R1 through the fourth flow path defining portion 71 and first through-hole 67 of the cavity ring 60, the flow path R1 being defined by the second flow path defining portion 58. Then, the cooling medium is introduced into a flow path R2 defined by the third flow path defining portion 66 of the cavity ring 60, the shoulder portion 53 of the inner cavity member 50, the body protrusion portion 55 of the inner cavity member 50, and the body portion 56 of the inner cavity member 50. Then, the cooling medium is introduced into a flow path R3 defined by the first flow path defining portion 57. Finally, the cooling medium is discharged to the discharge conduit 35 through a flow path R4 defined by the second through-hole 69, the second through-hole 69 being configured by the shoulder portion 53 of the inner cavity member 50 and the cutout 68 of the cavity ring 60.

One discharge conduit 35 is communicated with upper portions of the cavity cooling portions 34 corresponding to a half part of a cavity row 22 (six cavities). A discharge conduit 35 communicated with the cavity cooling portion 34 provided around the half number of cavities 21, which is located close to the discharge port 37, extends up to the half part of the corresponding cavity row 22. A discharge conduit 35 communicated with the cavity cooling portion 34 provided around the half number of cavities 21, which is located apart from the discharge port 37, extends up to a cavity 21 located on the farthest side from the discharge port 37. Three discharge conduit 35 are provided for one collecting conduit 36, and thus communicated with the same one collecting conduit 36. Also, the discharge conduits 35 are provided to be parallel to each other within a range of extension of the corresponding collecting conduit 36.

The collecting conduit 36 is provided at a location, which is located closer to the side surface 23 than to the cavity 21, in the injection cavity mold 20. The collecting conduit 36 is configured to collect the cooling medium discharged from three discharge conduits 35 into one flow path. Two collecting conduits 36 are provided, and thus the respective collecting conduits 36 are communicated with the respective discharge ports 37, independently. Two discharge ports 37 are provided on the side surface 23. The two discharge ports 37 are provided at respective locations on the side surface 23, which are spaced from the center thereof. Also, each of the collecting conduits 36 extends from the outer cavity row 22a (22b) to the inner cavity row 22c.

The side surface 23 on which the supply ports 31 are provided and the side surface 23 on which the discharge ports 37 are provided are opposite to each other. Also, the discharge conduits 35 are provided nearer to a top surface 24 of the injection cavity mold 20, in which the cavities 21 are provided, than are the supply conduits 33. The distribution conduits 32 and the collecting conduits 36 are provided nearer to a bottom surface 25 of the injection cavity mold 20 than the supply conduits 33, the bottom surface 25 being opposite the top surface 24. The distribution conduits 32 and the collecting conduits 36 are formed to have approximately the same diameter, and the supply conduits 33 and the discharge conduits 35 are formed to have approximately the same diameter. The distribution conduits 32 are formed to have a diameter greater than that of the supply conduits 33, and the collecting conduits 36 are formed to have a diameter greater than that of the discharge conduits 35.

FIG. 4 is a view showing an aspect in which the neck mold 41 including the pitch changing mechanism 40 is clamped on the injection cavity mold 20 according to the present embodiment. When the neck mold 41 is clamped on the injection cavity mold 20, the pitch changing mechanism 40 is arranged in the vicinity of the center of the side surfaces 23. The supply ports 31 and the discharge ports 37 are provided in a non-interference area where the supply ports 31 and the discharge ports 37 do not come into contact with the pitch changing mechanism. Meanwhile, a molten resin is introduced from the injection device 15 into the injection cavity mold 20 through the hot runner 80 fixed on the base 18.

Due to the above configurations, it is possible to suitably distribute and supply the cooling medium from one distribution conduit 32 into the outer cavity row 22a (22b) and the inner cavity row 22c. Also, it is possible to collect and discharge the cooling medium from the outer cavity row 22a (22b) and the inner cavity row 22c through one collecting conduit 36.

However, in a conventional mold, in which the number of supply ports and discharge ports is small and a cooling flow path cooling a plurality of cavity rows using a continuous circuit is provided, there is a possibility that a difference between a temperature of a cooling medium in the vicinity of the supply ports and a temperature of the cooling medium in the vicinity of the discharge ports becomes larger. Accordingly, there is a risk that unevenness in cooling conditions occurs and also cavities on a downstream side cannot be sufficiently cooled. If supply ports, supply conduits, discharge ports and discharge conduits, which have a larger diameter, are provided, it is possible to increase an amount of water and also to make the cooling conditions even. However, a proportion of the cooling flow path occupied in the mold is increased and thus a size or shape of a molded article, which can be injection-molded, is limited.

According to the injection cavity mold 20 of the present embodiment, the cooling flow path 30 including two supply ports 31 and two discharge ports 37 is provided. Therefore, it is possible to increase an amount of water without increasing a diameter of the cooling flow path, thereby ensuring an increased cooling capability. Also, the supply conduits 33 and the discharge conduits 35 are provided to be parallel to the cavity rows 22 and also at least one supply conduit 33 and at least one discharge conduit 35 are provided for each cavity row 22. Therefore, it is possible to make cooling conditions in each of the cavity rows 22 even and thus to make cooling conditions in the injection cavity mold 20 even.

Also, according to the injection cavity mold 20 of the present embodiment, the cooling medium is supplied to the cavity cooling portions 34 corresponding to a half part of the cavity row 22 through the respective supply conduits 33. Therefore, it is possible to reduce the number of cavity cooling portions 34 per one supply conduit 33, thereby making cooling conditions in each of the cavities 21 even and thus making cooling conditions in the Injection cavity mold 20 further even. Also, it is possible to reduce a diameter of each of the supply conduit 33, thereby enhancing flexibility in arrangement of the cooling flow path in the mold and also reducing limitations on a size or shape of a molded article.

Further, according to the injection cavity mold 20 of the present embodiment, the distribution conduit 32 is provided for each supply port 31 independently, and the collecting conduit 36 is provided for each discharge port 37 independently. Therefore, it is possible to stably supply and discharge the cooling medium, thereby stably performing cooling.

Further, in a molding machine including a pitch changing mechanism, the pitch changing mechanism is arranged in the vicinity of the center of a plane perpendicular to a row of molds in a closed mold state. Therefore, an area, in which a water supply port and a water discharge port can be provided, are limited. If three or more cavity rows are provided in a mold of the above molding machine, it is difficult to evenly cool an inner cavity row and outer cavity rows of the mold under a similar cooling condition according to a conventional method. According to the injection cavity mold 20 of the present embodiment, the supply ports 31 and the discharge ports 37 are provided in a non-interference area with respect to the pitch changing mechanism 40. The supply conduits 33 and the discharge conduits 35 are provided parallel to the cavity rows 22 and also are provided for each cavity row 22. If the injection cavity mold 20 is used for the molding machine 10 equipped with the pitch changing mechanism 40, it is possible to suitably cooling the mold.

Also, the inner member defining the cavity requires a strength to some extent so as to withstand a mold clamping pressure when clamping the cavity mold, the neck mold and the core mold (not shown) together during injection molding. Further, the inner member is configured to allow a cooling medium to flow therethrough, thereby cooling an injection-molded preform. From the viewpoint of enhancing the cooling efficiency, it is preferable that a flow path for the cooling medium flowing inside the inner member is as close as possible to an inner wall surface of the inner member. However, in the inner member configured by a single member, if the flow path for the cooling medium is provided at a site close to the inner wall surface of the inner member, a thickness of a portion of the inner member close to the inner wall surface is locally decreased and thus a strength (stiffness) of the portion is reduced. Therefore, the portion cannot withstand a mold clamping pressure. Accordingly, it may be conceived to manufacture an inner member, in which a cooling medium flow path is arranged near to a cavity, by a diffusion bonding method. However, this method results in high costs and also, if the bonding degree is insufficient, results in leakage of the cooling medium. In addition, during injection molding, heat is transferred to the inner member from a hot runner, which is located under the inner member. As a result, there is a risk that the inner member configured by a single member decreases cooling efficiency.

According to the injection cavity mold 20 of the present embodiment, the inner member is configured by two members of the inner cavity member 50 and the cavity ring 60. Therefore, heat from the hot runner is interrupted at the cavity ring 60, thereby reducing heat to be transferred to the inner cavity member 50. Accordingly, it is possible to inhibit the cooling efficiency from being decreased as compared with the case where the inner member is configured by a single member.

Further, the shoulder portion 53 of the inner cavity member 50 has a thickness. The shoulder portion 53 abuts against the upper surface portion 62 of the cavity ring 60 at a bottom surface of the shoulder portion 53 in a state where the inner member is fitted in the recess portion of the injection cavity mold 20. By increasing a contact area to withstand a mold clamping pressure and also increasing a thickness of the shoulder portion, on which the pressure is to be exerted, it is possible to secure both the cavity 21 and the strength required to withstand the mold clamping pressure. In addition, by forming the inner cavity member 50 and the cavity ring 60 as separate members, it is possible to reduce a thickness of the body portion 56 isolating the cavity 21 from the cooling medium and thus to allow the cooling medium to flow at an area close to the inner wall surface 51, while securing the required strength. In this way, an enhanced cooling efficiency can be obtained.

Meanwhile, the mold clamping pressure during injection molding is set depending on a cross-section area of a single cavity body and the number of cavities. In order to allow the shoulder portion of the inner cavity member abutting against the neck mold and the like to have the strength (stiffness) for withstanding the mold clamping pressure, it is necessary for the shoulder portion to have a thickness. If the inner member configured by a single member (single inner cavity member) is employed, it is necessary to increase the thickness of the shoulder portion in order to allow the inner member itself to withstand the mold clamping pressure. In contrast, according to the above embodiment, in which the inner member is configured by the inner cavity member 50 and the cavity ring 60, the cavity ring 60 can bear the mold clamping pressure exerted on the shoulder portion 53 of the inner cavity member 50. Therefore, as compared with the case of the inner member configured by a single member, it is possible to reduce the thickness of the shoulder portion 53. Accordingly, it is possible to locate a cooling circuit for the cooling medium closer to the inner wall surface of the cavity 21, thereby enhancing the cooling efficiency of the injection cavity mold 20.

Meanwhile, the present invention is not limited to the foregoing embodiments, and thus appropriate changes, modifications and the like may be freely made thereto. In addition, the material, shape, dimension, numerical value, form, number, arrangement location and the like of each component of the foregoing embodiments are arbitrary and not limited, as long as the present invention can be achieved.

For example, a single distribution conduit 32 or a single collecting conduit 36 may be provided, the single distribution conduit 32 or the single collecting conduit 36 extending across outer cavity rows 22a, 22b. Two or more supply ports 31 or discharge ports 37 may be provided on the single distribution conduit 32 or the single collecting conduit 36. Also, in the case of the above configuration, one supply port 31 or discharge port 37 may be provided as long as a sufficient cooling efficiency is obtained.

This application is based on Japanese Patent Application No. 2017-173440 filed on Sep. 8, 2017, the entire contents of which are incorporated herein by reference. Also, all references cited herein are incorporated in their entirety.

REFERENCE SIGNS LIST

10: Molding machine
11: Injection molding unit
12: Temperature adjustment unit
13: Blow molding unit
14: Removing unit
15: Injection device
16: Transport means
16a: Rotary plate
20: Injection cavity mold
21: Cavity
22: Cavity row
23: Side surface
24: Top surface
25: Bottom surface
30: Cooling flow path
31: Supply port
32: Distribution conduit
33: Supply conduit
34: Cavity cooling portion
35: Discharge conduit
36: Collecting conduit
37: Discharge port
40: Pitch changing mechanism
41: Neck mold
42: Neck mold guide member

The invention claimed is:

1. A mold for injection molding, the mold comprising:
three or more cavity rows, each cavity row having a plurality of cavities; and
a cooling flow path configured to allow a cooling medium to flow through the cooling flow path, the cooling medium cooling the cavities, the cooling flow path including:
at least one supply port;
a distribution conduit communicated with the supply port;
two supply conduits communicated with the distribution conduit;
a cavity cooling portion communicated with the two supply conduits and provided to an outer periphery of the cavities;
two discharge conduits communicated with the cavity cooling portion;
a collecting conduit communicated with the two discharge conduits; and
at least one discharge port communicated with the collecting conduit,
wherein the two supply conduits and the two discharge conduits are parallel to the cavity rows,
wherein the two supply conduits and the two discharge conduits are provided for each cavity row, and
wherein the cooling medium is configured to be supplied from one supply conduit to the cavity cooling portion corresponding to a half part of each cavity row in a direction parallel to the cavity rows.

2. The mold according to claim 1,
wherein the distribution conduit and the collecting conduit are respectively provided for the at least one supply port and for the at least one discharge port, and
wherein the distribution conduit is provided independently, and the collecting conduit is provided independently.

3. The mold according to claim 1,
wherein the mold is for a molding machine including a pitch changing mechanism configured to change a distance between rows of neck molds, and
wherein the supply port and the discharge port are provided in a non-interference area with respect to the pitch changing mechanism.

4. The mold according to claim 1,
wherein at least one cavity is defined by an inner member, the inner member being fitted in a recess portion of the mold, the inner member being configured by two members of an inner cavity member and a cavity ring.

5. The mold according to claim 4,
wherein the inner cavity member has an inner wall surface defining the at least one cavity, and includes a shoulder portion abutting against a neck mold during injection molding,
wherein the cavity ring is a member having a hollow space inside the cavity ring, the inner cavity member being arranged in the hollow space, the cavity ring including an upper surface portion abutting against the shoulder portion, and
wherein the cooling flow path provided in the inner cavity member and the cavity ring configures the cavity cooling portion.

6. The mold according to claim 1,
wherein the half part of each cavity row is located adjacent to the distribution conduit,
wherein one supply conduit of the two supply conduits extends up to the half part of a corresponding cavity row from the distribution conduit,
wherein the cooling medium is configured to be supplied from another supply conduit of the two supply conduits to the cavity cooling portion corresponding to the half part of each cavity row, which is located adjacent to the collecting conduit, and
wherein the another supply conduit of the two supply conduits extends up to the half part of each cavity row adjacent to the collecting conduit from the distribution conduit.

* * * * *